United States Patent
Nguyen et al.

(10) Patent No.: US 8,542,823 B1
(45) Date of Patent: Sep. 24, 2013

(54) PARTIAL FILE ENCRYPTION

(75) Inventors: Luan K. Nguyen, Seattle, WA (US);
William A. Strand, Issaquah, WA (US);
Jason A. Bliss, Kent, WA (US);
Geoffrey E. Endresen, Renton, WA (US);
Bethel S. McMillan, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 511 days.

(21) Appl. No.: 12/457,684

(22) Filed: Jun. 18, 2009

(51) Int. Cl.
*H04L 29/06* (2006.01)

(52) U.S. Cl.
USPC .............................. 380/42; 713/189; 713/193

(58) Field of Classification Search
USPC .......................................................... 380/42
See application file for complete search history.

(56) References Cited

U.S. PATENT DOCUMENTS

| | | | |
|---|---|---|---|
| 3,956,615 A * | 5/1976 | Anderson et al. | 705/72 |
| 6,178,243 B1 * | 1/2001 | Pomerantz et al. | 380/243 |
| 6,449,718 B1 * | 9/2002 | Rucklidge et al. | 713/168 |
| 2001/0029582 A1 * | 10/2001 | Goodman et al. | 713/193 |
| 2005/0091499 A1 * | 4/2005 | Forlenza et al. | 713/176 |
| 2005/0229009 A1 * | 10/2005 | Fujii et al. | 713/186 |
| 2005/0240759 A1 * | 10/2005 | Rubin et al. | 713/153 |
| 2005/0246526 A1 * | 11/2005 | Forlenza et al. | 713/165 |
| 2006/0005017 A1 * | 1/2006 | Black et al. | 713/165 |
| 2006/0075228 A1 * | 4/2006 | Black et al. | 713/167 |
| 2006/0294377 A1 * | 12/2006 | Ho et al. | 713/170 |
| 2007/0076874 A1 * | 4/2007 | Suleiman et al. | 380/243 |
| 2008/0031448 A1 * | 2/2008 | Dang et al. | 380/200 |
| 2008/0178269 A1 * | 7/2008 | Kim et al. | 726/4 |

FOREIGN PATENT DOCUMENTS

WO    WO 2005071873 A1 *    8/2005

* cited by examiner

*Primary Examiner* — Mohammad L Rahman
(74) *Attorney, Agent, or Firm* — Kilpatrick, Townsend & Stockton

(57) ABSTRACT

Systems and methods are provided for partially encrypting one or more portions of an electronic file and decrypting the partially encrypted file. In one implementation, a computer-implemented method partially encrypts an electronic file. The method identifies one or more portions of the electronic file to be encrypted. The one or more portions are identified based on metadata in the electronic file that designate the one or more portions to be encrypted. The method encrypts the identified one or more portions of the electronic file using encryption software.

33 Claims, 4 Drawing Sheets

| Field | Value | Ref |
|---|---|---|
| First Name: | John | 202 |
| Last Name: | Smith | 204 |
| Address: | 123 Main Street | 206 |
| City: | Seattle | 208 |
| State: | WA | 210 |
| ZIP Code: | 98101 | 212 |
| Card Type: | Visa | 214 |
| Card No.: | 1234 5678 9012 3456 | 216 |
| Exp. Date: | May 2010 | 218 |

Figure 2A

| Field | Value | Ref |
|---|---|---|
| First Name: | John | 202 |
| Last Name: | Smith | 204 |
| Address: | 123 Main Street | 206 |
| City: | Seattle | 208 |
| State: | WA | 210 |
| ZIP Code: | 98101 | 212 |
| Card Type: | Visa | 214 |
| Card No.: | ▮▮▮▮ | 216 |
| Exp. Date: | ▮▮▮▮ | 218 |

Figure 2B

PARTIAL FILE ENCRYPTION

BACKGROUND

In today's information-intensive environment, information is often electronically transmitted in the normal course of business and other activities. Businesses and individuals want to ensure that these transmissions of proprietary, sensitive, or identity-related information are protected from unauthorized use or theft. One tool that businesses and individuals can use to secure information is a cryptographic technique called encryption. Encryption uses an algorithm to convert information (i.e., plaintext) into a form that is unreadable (i.e., ciphertext) to unauthorized persons. Authorized persons who possess special information, such as a password or key, can convert the unreadable information back to its original form using a decryption algorithm.

Public key-private key cryptography, which makes use of asymmetric key algorithms, is a frequently used encryption technique. In this technique, an encryption algorithm uses a receiver's public key, which is widely available, to encrypt information. A decryption algorithm uses the receiver's private key, which is not available to others, to decrypt the information. The public key and the private key are related mathematically, but the private key cannot feasibly be derived from the public key.

Another encryption technique, called symmetric-key cryptography, makes use of a single secret key, which is shared by a sender and a receiver. The secret key is used by encryption and decryption algorithms to both encrypt and decrypt information. Unlike public key-private key cryptography, symmetric-key cryptographic techniques require the sender and the receiver to securely share the secret key in advance. To ensure security of the secret key, the sender and receiver share the secret key separately from the transmission of the encrypted information.

Regardless of which encryption technique is used, encryption transforms information in an entire electronic file so that all of information in the encrypted electronic file is rendered unreadable. The encrypted electronic file is transmitted from a sender to a receiver and the receiver uses an appropriate key to decrypt the electronic file and render the information readable. Consequently, an entity that intercepts or inadvertently receives the encrypted file will be unable to read any of the information that is contained in the file without the appropriate key.

Encrypting all of the information in an electronic file is sometimes not necessary and, in certain circumstances, it may even be desirable to have some of the information remain readable. For example, it may be desirable to transmit a document such that certain information (e.g., a name) remains readable while maintaining secret other sensitive information in the document (e.g., a social security number (SSN), bank account number, etc.). However, as discussed above, conventional encryption techniques render all of the information in an encrypted electronic file unreadable. Therefore, there is a need for improved systems and methods that provide alternatives to conventional encryption techniques.

BRIEF DESCRIPTION OF THE DRAWINGS

The accompanying drawings, which are incorporated in and constitute a part of this disclosure, illustrate various disclosed embodiments. In the drawings:

FIG. 2A shows an example of a document prior to partial encryption;

FIG. 2B show an example of the document shown in FIG. 2A after being partially encrypted;

DETAILED DESCRIPTION

Figure 1:
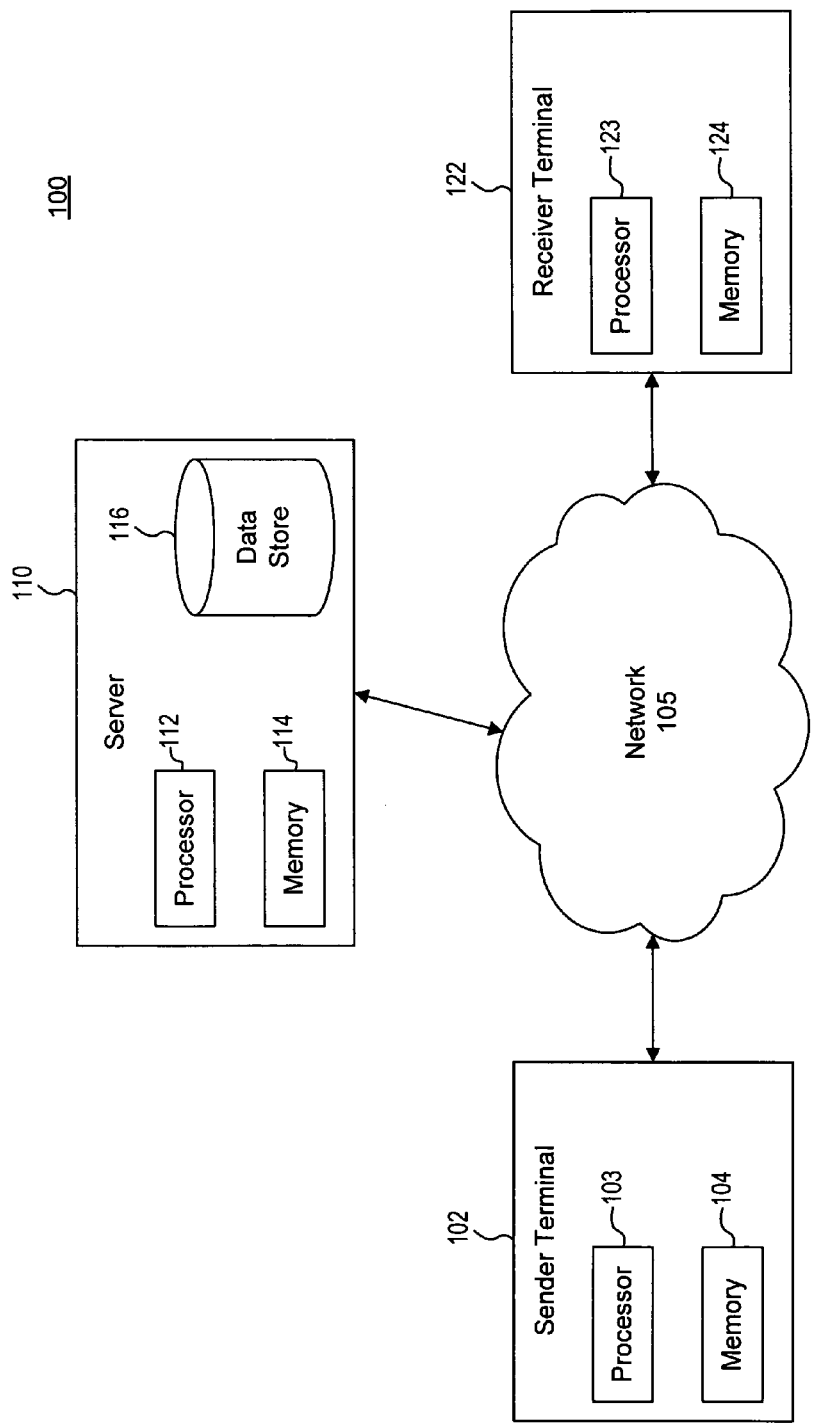
FIG. 1 is a diagram of an example of a system for encrypting and decrypting one or more portions of an electronic file.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, or adding blocks to the disclosed methods. Accordingly, the following detailed description is not limiting of the disclosed embodiments. Instead, the proper scope is defined by the appended claims.

Disclosed embodiments provide computer-implemented systems and methods for partially encrypting an electronic file. In one embodiment, a sender may use encryption software to encrypt one or more portions of an electronic file. A receiver may use decryption software to decrypt the encrypted portions of the partially encrypted electronic file using a key. Because certain portions of the file are encrypted, the file can be transferred in a "non-secure" way (e.g., email). Furthermore, because sensitive portions of the electronic file are encrypted, other portions of the electronic file that are not encrypted remain readable. For example, sensitive information (e.g., a bank account number) in an electronic file may be encrypted, while other information in the electronic file may remain readable (e.g., a name).

In one embodiment, a software application may provide tags in an electronic file that denote the beginning and end of a portion of information (e.g., text, an image, data, etc.) that the user wishes to encrypt. Encryption software may encrypt the information within the tags, leaving the file itself unencrypted. When the file needs to be opened and the encrypted portions need to be decrypted, a software application may be used to decrypt the encrypted portions of the electronic file.

Consistent with a disclosed embodiment, a method is provided for partially encrypting an electronic file. The method may including receiving a selection of one or more portions of the electronic file to be encrypted and storing, in the electronic file, metadata designating the selected one or more portions to be encrypted. The method may further include detecting the metadata to identify the selected one or more portions and encrypting the one or more identified portions of the electronic file using encryption software.

Consistent with another disclosed embodiment, a computer-implemented method is provided for partially encrypting an electronic file. The method may identify one or more portions of the electronic file to be encrypted, based on metadata in the electronic file designating the one or more portions of the electronic file to be encrypted. The method may encrypt the identified one or more portions of the electronic file using encryption software.

Consistent with another disclosed embodiment, a computer-implemented method is provided for decrypting a partially encrypted electronic file. The method may identify one or more portions of the electronic file to be decrypted, based on metadata in the electronic file designating the one or more encrypted portions of the electronic file. The method may further decrypt the identified one or more encrypted portions of the electronic file using decryption software.

Consistent with yet another disclosed embodiment, a system is provided for partially encrypting an electronic file. The system includes a processor for executing program instructions and a memory storing the program instructions. The program instructions, when executed by the processor, perform a process to identify one or more portions of the electronic file to be encrypted, based on metadata in the electronic file designating the one or more portions of the electronic file to be encrypted. The program instructions further encrypt the identified one or more portions of the electronic file using encryption software.

Consistent with yet another disclosed embodiment, a system is provided for partially decrypting an electronic file. The system includes a processor for executing program instructions and a memory storing the program instructions. The program instructions, when executed by the processor, performing a process to identify one or more portions of the electronic file to be decrypted, based on metadata in the electronic file designating the one or more encrypted portions of the electronic file. The program instructions further decrypt the identified one or more encrypted portions of the electronic file using decryption software.

Consistent with another disclosed embodiment, a method is provided for partially encrypting an electronic file. The method may identify one or more portions of the electronic file to be encrypted, based on a characteristic of text in the electronic file. The method may further encrypt the identified one or more portions of the electronic file using encryption software.

Consistent with other disclosed embodiments, a computer-readable storage medium may store program instructions, which when executed by a processor, perform any of the above-described methods.

FIG. 1 is an example of a system 100 for encrypting and decrypting one or more portions of a file, consistent with a disclosed embodiment. As shown in system 100, a sender terminal 102, a server 110, and a receiver terminal 122 are connected to a network 105. One of skill in the art will appreciate that although one sender terminal, one server, and one receiver terminal are depicted in FIG. 1, any number of these components may be provided. Furthermore, one of ordinary skill in the art will recognize that one or more components of system 100 may be combined and/or divided into subcomponents. For example, functionality provided by sender terminal 102 and server 110 may be combined and/or functionality provided by receiver terminal 122 and server 110 may be combined.

Network 105 provides communications between the various components in system 100, such as sender terminal 102, server 110, and receiver terminal 122. In addition, sender terminal 102, server 110, and/or receiver terminal 122 may access legacy systems (not shown) via network 105, or may directly access legacy systems, data stores, or other network applications. Network 105 may be a shared, public, or private network, may encompass a wide area or local area, and may be implemented through any suitable combination of wired and/or wireless communication networks. Network 105 may further comprise an intranet or the Internet.

Sender terminal 102 and receiver terminal 122 may each be any type device for communicating with one another and/or server 110 over network 105. For example, a user of sender terminal 102 may transmit data to and/or receive data from server 110 or receiver terminal 122. Similarly, a user of receiver terminal 122 may transmit data to and/or receive data from server 110 or sender terminal 102. Sender terminal 102 and receiver terminal 122 may be personal computers, handheld devices (e.g., PDAs, cellular phones, etc.), or any other appropriate computing platform or device capable of exchanging data with network 105.

Sender terminal 102 may include a processor 103 and a memory 104, and, similarly, receiver terminal 108 may include a processor 123 and a memory 124. Memories 104 and 124 may store instructions which, when executed by processors 103 and 123, respectively, provide applications for encrypting and/or decrypting one or more portions of an electronic file. The stored instructions may further provide one or more graphical user interfaces (GUIs) for performing functionality that is consistent with disclosed embodiments. The instructions that are stored in memories 104 and 124 may be provided as part of standalone applications or may be provided as part of plug-in applications that may work in connection with other software applications (e.g., word processing, email, or other applications executing on sender terminal 102 and/or receiver terminal 122).

Consistent with disclosed embodiments, memories 104 and 124 may store instructions for a software application (e.g., a plug-in) that identify one or more portions of a file for encryption, encrypt the identified one or more portions, and/or allow a user to decrypt the encrypted one or more portions of the electronic file with a key. As part of the encryption process, the software application may use a key to encrypt the one or more portions of the electronic file. For example, the software application may make use of a public key of a receiver. Alternatively, the software application may generate a key that will need to be shared with a receiver in order for the receiver to decrypt the one or more portions of the electronic file.

The software application may detect the one or more portions of the electronic file that are to be encrypted in a variety of ways. For example, the software application may automatically detect a portion or portions of an electronic file that are predefined to be encrypted. The one or more portions of the electronic file may be identified based on metadata included in the electronic file. For example, the electronic file may include tags designating the start and end of a portion of the electronic file to be encrypted.

Alternatively, a user of sender terminal 102 may select the one or more portions of an electronic file that are to be encrypted in a variety of ways. For example, a user at sender terminal 102 may type or insert tags into the document to designate the start and end of text to be encrypted. A start tag may indicate that text following the tag should be encrypted and an end tag may indicate that text following the tag should not be encrypted. For example, the user may type or insert the start tag (e.g., a tag of <start.encrypt>) before the text to be encrypted and may type the end tag (e.g., a tag of <end.encrypt>) following the text to be encrypted.

In other embodiments, a user of sender terminal 102 may select tags for insertion from, for example, a toolbar or menu provided by the software application (e.g., a plug-in) executing on sender terminal 102. As discussed above, data identifying a portion of an electronic file that should be encrypted may be stored as metadata in the file. In still other embodiments, the user at sender terminal 102 may use a certain font size (e.g., 14-point font) or style (e.g., underlined text) to identify text that should be encrypted (e.g., encrypt all text in 14 point font, all underlined text, etc.).

Server 110 may comprise a general purpose computer (e.g., a personal computer, network computer, server, or mainframe computer) having one or more processors that may be selectively activated or reconfigured by a computer program. Server 110 may be implemented in a distributed network. For example, server 110 may communicate via a network 105 with additional servers (not shown), which may enable server 110 to distribute processes for parallel execution by a plurality of servers. Alternatively, server 110 may be specially constructed for carrying-out methods consistent with disclosed embodiments.

As depicted in FIG. 1, server 110 may include a processor 112, a memory 114, and a data store 116. Memory 114 may comprise one or more memory or storage devices that store data as well as software. Memory 114 may also comprise, for example, one or more of RAM, ROM, magnetic storage, or optical storage. Memory 114 may store instructions which, when executed by processor 112, perform one or more processes consistent with disclosed embodiments. For example, memory 104 may store a software application that may detect and encrypt one or more portions of an electronic file, as discussed above. Accordingly, consistent with one embodiment, a user of sender terminal 102 may transmit over network 105 an electronic file to server 110 for partial encryption. Furthermore, the software application stored in memory 114 may generate keys for use in decrypting partially encrypted files.

Data store 116 may comprise one or more storage devices, such as disk storage devices, optical storage devices, etc., which may store keys and other data. In one embodiment, data store 116 may constitute a key store including keys that are used to decrypt partially encrypted files. In some embodiments, the keys and other data may be accessible by sender terminal 102 and/or receiver terminal 122 through an application program interface (API) of a Web Service. For example, data store 116 may store identifiers of electronic files, which server 110 may use to retrieve an appropriate key for a particular file.

For example, in one embodiment, server 110 may serve a document to receiver terminal 122. The document may include an option for a user to log onto a secure site provided by server 110. The user may log onto the secure site provided by server 110 by supplying credentials, such as a username and a password. Because the site may use a secure communication environment, such as an HTTPS (hypertext transfer protocol secure) environment to transfer data over network 105, data transfer is assumed to be secure. Once the user has been authenticated, server 110 may check for keys that are associated with the receiver (e.g., a key transmitted to data store 116 by the sender and associated with an identifier of the receiver).

Data store 116 may store a variety of different kinds of keys. In one embodiment, data store 116 may store public keys, which are accessible over network 105. For example, sender terminal 102 or server 110 may access data store 116 to retrieve a public key when encrypting one or more portions of an electronic file. In other embodiments data store 116 may store specific use or limited use keys. For example, data store 116 may store a key that is associated with a particular electronic file (e.g., for use in decrypting encrypted portions of an electronic file having a particular identifier). Furthermore, data store 116 may store a key that has an expiration date (e.g., expires after January 1), is valid during a certain time period (e.g., valid for one day, one week, etc.), is valid for a single use or limited use (e.g., can be used five times before it expires), or may not be used until a certain date (e.g., not valid until December 1).

FIG. 2A shows an example of a document 200 prior to partial encryption, consistent with a disclosed embodiment. Document 200 may be prepared and/or viewed using any number of software applications (e.g., word processor, spreadsheet, text editor, email, etc.). Furthermore, document 200 may store information in any number of electronic file formats (e.g., a wording processing document format, a text editor format, spreadsheet format, portable data format (PDF), web page format (e.g., HTML), database record format, e-mail message, etc.).

In the example shown in FIG. 2A, document 200 includes fields 202-218. In one embodiment, a user of sender terminal 102 may use a software application (e.g., a plug-in) to select one or more of fields 202-218 for encryption. In other embodiments, document 200 may include metadata designating that predefine certain ones of fields 202-218 as fields that should be encrypted. To select a field for encryption (e.g., field 216), a user at sender terminal 102 may highlight or select the field to designate that the text contained in that field should be encrypted. For example, a software application executing on sender terminal 102 may provide a toolbar or icon for selecting an option to encrypt text that is selected or highlighted, As shown in FIG. 2A, document 200 may constitute a form including, among other information, identity information and payment information. For example, document 200 includes a first name field 202, a last name field 204, an address field 206, a city field 208, a state field 210, a ZIP code field 212, a card type field 214, a card number field 216, and an expiration date field 218. Although document 200 includes the foregoing fields, one of ordinary skill in the art will recognize that document 200 may include additional fields for other information or may not include all of the fields that are shown in this example.

FIG. 2B shows an example of document 200 after being partially encrypted, consistent with a disclosed embodiment. For example, card number field 216 and expiration date field 218 have been encrypted. In the example shown in FIG. 2B, the encrypted fields appear as a solid color (e.g., black, as if redacted). One of ordinary skill in the art will recognize that any number of techniques may be used to designate portions of document 200 that have been encrypted (e.g., colors, other text, images, etc.). Prior to decryption, one may read the portions of document 200 that were not encrypted (e.g., fields 202-214). However, the one or more portions of document 200 that have been encrypted (e.g., fields 216 and 218) are rendered unreadable until decrypted using an appropriate key.

In other embodiments, document 200 may not include predefined fields and may instead constitute a document, such as a word processing document, text file, or email message. A user at sender terminal 202 may type or insert tags into the document to designate the start and end of text to be encrypted. A start tag may indicate that text following the tag should be encrypted and an end tag may indicate that text following the tag should not be encrypted. For example, the user may type or insert the start tag (e.g., a tag of <start.encrypt>) before the text to be encrypted and may type the end tag (e.g., a tag of <end.encrypt>) following the text to be encrypted. In other embodiments, a user of sender terminal 102 may select tags for insertion from, for example, a toolbar or menu provided by a software application (e.g., a plug-in) executing on sender terminal 102.

Data identifying portions of an electronic file that should be encrypted may be stored as metadata in the file. In other embodiments, the user at sender terminal 102 may use a certain text characteristic, such as font size (e.g., 12 point font), font style (e.g., bold), or font (e.g., Times New Roman), to designate that that certain text should be encrypted (e.g., encrypt text in 14 point font, text in italics, bold text, underlined text, text in Arial font, text in Courier font, etc.). Alternatively, the software application executing on sender terminal 102 may automatically recognize a predetermined characteristic of a portion of text in the electronic file, such as font size, font style, or font, as constituting text that should be encrypted. A user may designate to the software application one or more text characteristics that identify text that is to be encrypted and/or the software application may provide one or more predetermined text characteristics that identify text that is to be encrypted. Still further, alternatively, or in addition to any portions of an electronic that are selected by the user, the software application executing on sender terminal 102 may suggest that a portion of a document be encrypted. For example, the software application may detect sensitive portions of the document and recommend that the detected portions be encrypt (e.g., the text appears to be a social security number).

After selecting the text for encryption, a user of sender terminal 102 may select a command (e.g., an "encrypt" command) that causes encryption software executing on sender terminal 102 to use an encryption algorithm to encrypt one or more selected portions of the document. As part of the encryption process, the software application executing on sender terminal 102 may use a key. Sender terminal 102 may retrieve the key, such as a public key of a receiver, from local storage (e.g., memory 104) or may access the key remotely over network 105 (e.g., data store 116). Alternatively, the software application may generate a key according to predetermined or user defined parameters (e.g., a specific use or limited use key).

As discussed above, encryption of electronic files may occur at sender terminal 102. In other embodiments, after the user selects one or more portions of an electronic file to encrypt or completes a document having predetermined portion or portions for encryption, sender terminal 102 may transmit the electronic file, along with data (e.g., metadata) indicating the one or more portions to be encrypted, to server 110. Server 110 may then encrypt the one or more portions using encryption software stored in memory 114. Furthermore, server 110 may then transmit the partially encrypted file to another server or a receiver (e.g., receiver terminal 122).

As discussed above, keys for decrypting partially encrypted files may be distributed in a variety of ways. For example, software executing on sender terminal 102 may generate a key for decrypting the encrypted portions of a file. The key may then be transmitted from sender terminal 102 to receiver terminal 122 at a time of the sender's choosing. Alternatively, receiver terminal 122 may request a key from sender terminal 102. In other embodiments, software executing on server 110 may generate a key. As discussed above, keys may be stored in data store 116 of server 110 and receiver terminal 122 may access the keys over network 105. Alternatively, key distribution may be unnecessary in embodiments where public key-private key encryption techniques are used.

Figure 3:
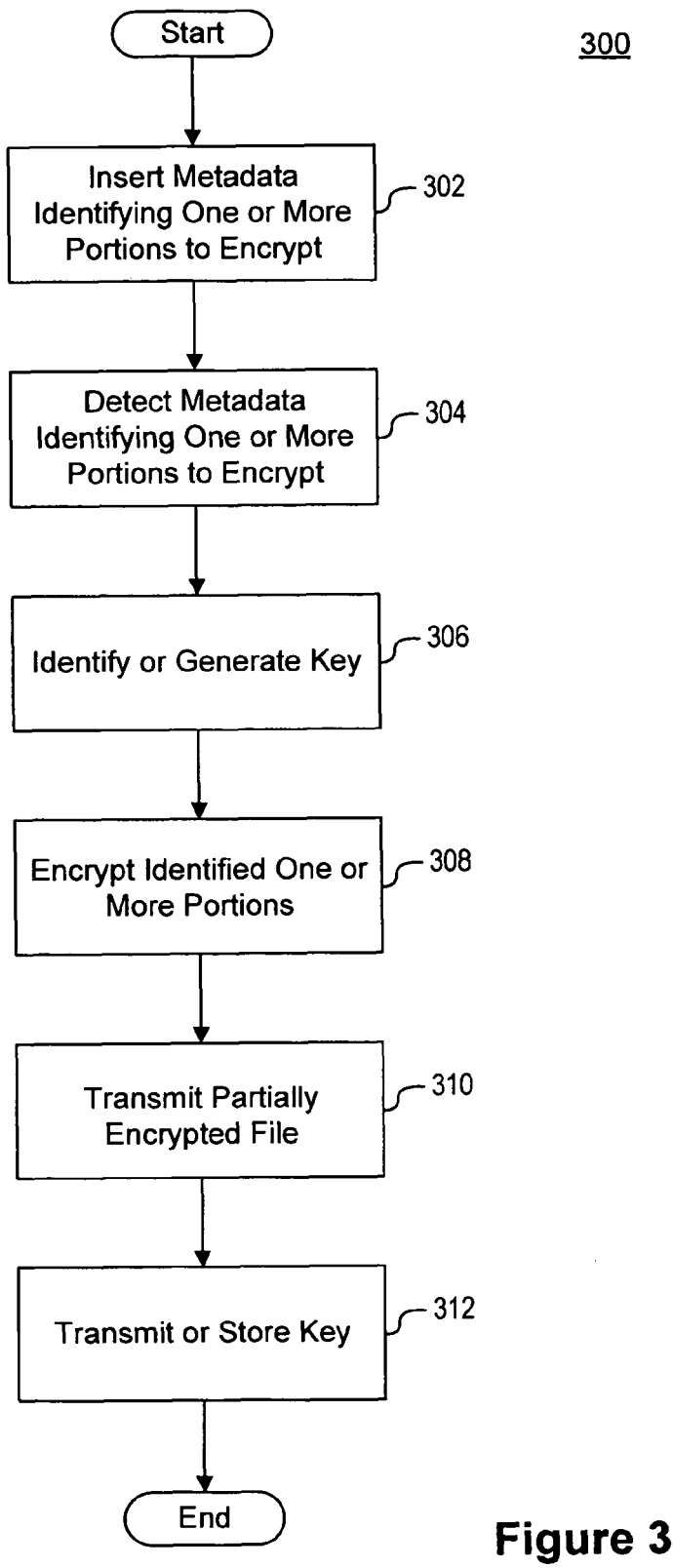
FIG. 3 is a flow diagram of an example of a routine for encrypting one or more portions of an electronic file.

FIG. 3 is a flow diagram of an example of a routine 300 for encrypting one or more portions of an electronic file, consistent with a disclosed embodiment. Routine 300 provides an overview of a process in which one or more portions of an electronic file are encrypted by software executing on sender terminal 102 or server 110. For example, in one embodiment, software executing on sender terminal 102 may execute instructions to perform routine 300. In another embodiment, software executing on server 110 may execute instructions to perform routine 300.

In block 302, sender terminal 102 or server 110 may insert metadata into an electronic file that identifies one or more portions to encrypt. For example, a user at sender terminal 102 may select or identify one or more portions of an electronic file to be encrypted or may insert tags directly into the electronic file, as discussed above. In other embodiments, block 302 may be optional as the electronic file may include metadata identifying a predetermined portion or portions of the electronic file to be encrypted. In other embodiments, the one or more portions of the electronic file to be encrypted may include text having a certain characteristic (e.g., font size, font style, or font).

In block 304, software executing on sender terminal 102 or server 110 may detect the one or more portions of an electronic file to be encrypted. As discussed above, the one or more portions to be encrypted may be designated by metadata included in the electronic file, such as tags, or may be detected based on certain characters, or text characteristics (e.g., font size, font style, or font).

In block 306, software executing on sender terminal 102 or server 110 may identify a key to be used to encrypt the identified one or more portions of the electronic file. For example, sender terminal 102 or server 110 may use a public key of the receiver. Furthermore, sender terminal 102 or server 110 may retrieve the public key of the receiver from memory 104 or data store 116. Alternatively, sender terminal 102 or server 110 may use a single secret key during encryption. For example, in some embodiments, as part of block 306, sender terminal 102 or server 110 may generate an appropriate key.

In block 308, sender terminal 102 or server 110 may encrypt the identified one or more portions of the electronic file. For example, sender terminal 102 or server 110 may encrypt the identified one or more portions using an appropriate encryption algorithm (e.g., RSA). Sender terminal 102 or server 110 may use the key that was identified in block 306 during the encryption process.

In block 310, sender terminal 102 or server 110 may transmit the partially encrypted file to, for example, receiver terminal 122 or another server available over network 105. For example, in one embodiment, a sender at sender terminal 102 may attach the partially encrypted file to an email message and send the email message to a receiver over network 105. Accordingly, the partially encrypted electronic file may be transmitted to a server from which the receiver may retrieve the partially encrypted electronic file by accessing an email account.

In block 312, sender terminal 102 or server 110 may transmit the key to receiver terminal 122. Alternatively, server 110 may store the key for later retrieval by the receiver. Furthermore, in some embodiments, this step may be optional because the encryption process may use a public key of the receiver or the receiver may use a secret key that is already in the receiver's possession to decrypt the encryption portions of the electronic file. In still yet other embodiments, the receiver may receive a request for a key at a later time from the sender.

Figure 4:
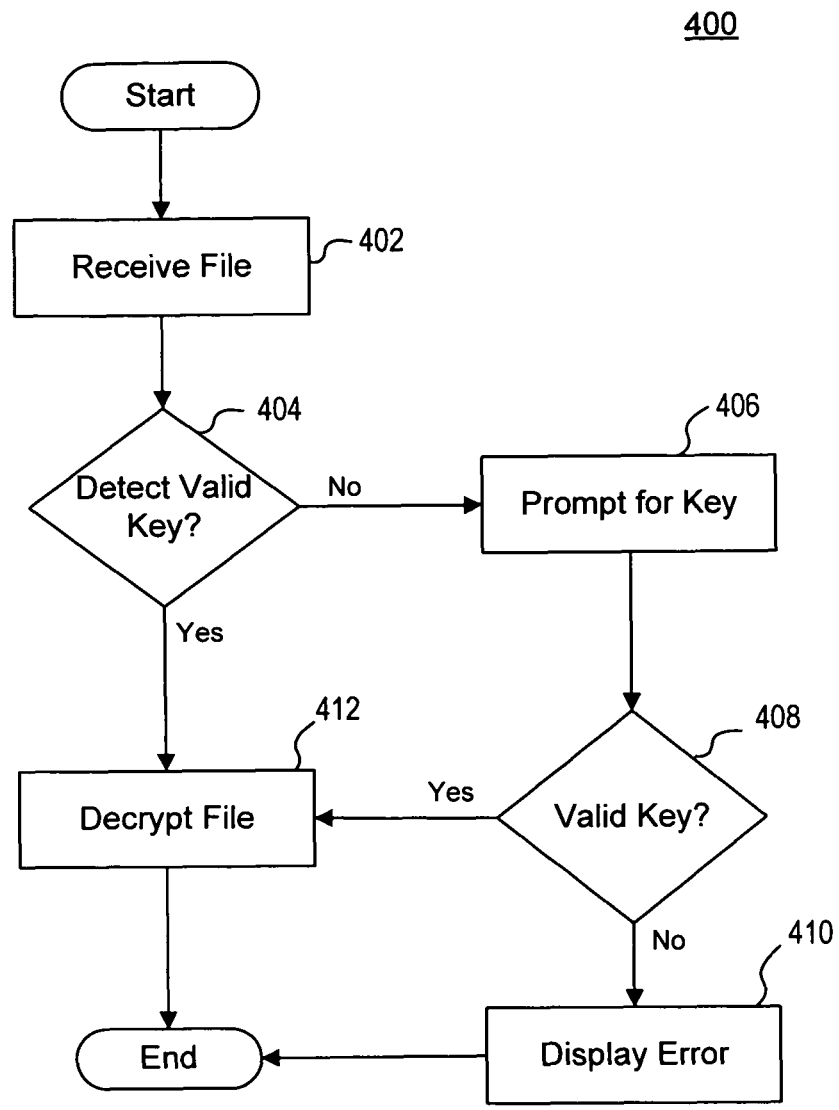
FIG. 4 is a flow diagram of an example of a routine for decrypting one or more portions of an electronic file.

FIG. 4 is a flow diagram of an example of a routine 400 for decrypting one or more portions of an electronic file, consistent with a disclosed embodiment. As part of routine 400, a software application executing on receiver terminal 122 may prompt the receiver for a key or the software application may automatically check for a key stored on receiver terminal 122 or server 110 when the receiver takes a particular action (e.g., opens the file).

In block 402, receiver terminal 122 may receive a partially encrypted electronic file. For example, a user at receiver terminal 122 may retrieve the partially encrypted electronic file by accessing an email account. As discussed above, the file may store information in any number of file formats (e.g., a wording processing document format, a text editor format, spreadsheet format, portable data format (PDF), web page format (e.g., HTML), database record format, e-mail message, etc.). A user at receiver terminal 122 may view the partially encrypted electronic file through any number of ways, such as a via browser software, email software, word processing software, spreadsheet software, a text editor, etc. When the partially encrypted electronic file is viewed prior to being decrypted, the encrypted portions may appear as discussed above in connection with FIG. 2B.

In block 404, a software application (e.g., a plug-in) executing on receiver terminal 122 may recognize that the electronic file includes encrypted information and automatically check whether a valid key for the electronic file is available in local memory (e.g., memory 124) or is available from a resource that is accessible over network 105. For example, the software application may recognize that the electronic file includes encrypted information when the file is opened for display by a word processing or text viewer application and then automatically check for a valid key.

In one embodiment, the software application may check memory 124 for a key (e.g., the receiver's secret key or another key). Alternatively, the software application may automatically send a request to access data store 116 of server 110. Server 110 may require the receiver to log onto a secure site by supplying credentials, such as a username and a password. Once the receiver has logged on, server 110 may check for any keys associated with the receiver (e.g., a key transmitted to data store 116 by the sender and associated with an identifier of the receiver). If the software application does not detect a valid key, the process proceeds to block 406. If the software application detects a valid key, then the process proceeds to block 412.

In block 406, the software application executing on receiver terminal 122 may prompt the receiver for a key. For example, the software application may display a message (e.g., "Please provide a key to decrypt the encrypted portions of the file."). The receiver may then select a key by, for example, loading a key from a storage device or selecting a key from a file folder.

In block 408, the software application executing on receiver terminal 122 may determine whether a valid key has been received. If the software application has received a valid key, then the process proceeds to block 412. If the software application has not receive a valid key, then the process proceeds to block 410. In block 410, the software application may display an error message (e.g., "The key is not valid for this file.").

In block 412, the software application may decrypt the encrypted one or more portions of the file with the key. For example, the software application may detect the encrypted portions by identifying metadata designating the encrypted portions. Furthermore, the software application may use an appropriate decryption algorithm to decrypt the encrypted one or more portions of the electronic file. The user may then view the information contained in the encrypted one or more portions. Furthermore, in some embodiments, the user may not be able to save the file in a decrypted form.

As one of ordinary skill in the art will appreciate, one or more of blocks 302-312 and 402-412 may be optional and may be omitted from implementations in certain embodiments. Furthermore, functionality provided by one or more of blocks 302-312 and 402-412 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method for partially encrypting an electronic file, comprising:
   determining, by a plug-in to a word processing system executing on a computing system, a named text style, the named text style including font size settings or font style settings, indicating a selection of one or more portions of the electronic file to be encrypted, wherein the named text style defines consistently formatted text;
   identifying, by a plug-in to a word processing system executing on the computing system, the one or more portions of the electronic file including the named text style that identifies the selected one or more portions of the electronic file to be encrypted;
   encrypting the identified one or more portions of the electronic file to thereby form encrypted one or more portions of the electronic file; and
   storing the electronic file with the encrypted one or more portions of the electronic file, altering the named text style to cause encrypted text having the named text style to appear as at least one block of color with a matching text color and background color, such that unencrypted portions of the electronic file are readable without the plug-in to the word processing system.

2. The computer-implemented method of claim 1, wherein the plug-in to the word processing system encrypts the one or more identified portions of the electronic file using a key.

3. The computer-implemented method of claim 2, wherein the key is a public key of an intended recipient of the partially encrypted electronic file.

4. The computer-implemented method of claim 2, the method further including retrieving the key from a server accessible over a network.

5. The computer-implemented method of claim 2, wherein the key is valid for a limited time period.

6. The computer-implemented method of claim 1, the method further comprising, presenting a highlighting tool, and wherein the one or more portions of the electronic file were selected by a user who highlighted the one or more portions of the electronic file via the highlighting tool.

7. The computer-implemented method of claim 1, the method further comprising, presenting a text style selection tool, and wherein the one or more portions were selected by a user who applied the named text style to the one or more portions of the electronic file via the text style selection tool.

8. The computer-implemented method of claim 1, wherein detecting, by the computing system, the named text style to identify the selected one or more portions is performed without a request to detect the named text style.

9. The computer-implemented method of claim 1, further comprising:
displaying a representation of contents of the partially encrypted electronic file, the encrypted one or more portions being displayed as a block of solid color.

10. The computer-implemented method of claim 1, further comprising:
decrypting the partially encrypted electronic file using a decryption software plug-in to a word processor.

11. The computer-implemented method of claim 10, wherein the decryption software plug-in decrypts the partially electronic encrypted file using a key.

12. The computer-implemented method of claim 11, wherein the decryption software plug-in automatically detects the key.

13. A computer-implemented method for partially encrypting an electronic file, comprising:
receiving, at a server from a client system, an electronic file to be encrypted;
identifying one or more portions of the electronic file to be encrypted, based on at least one named text style, the at least one named text style determined by a plug-in to a word processing system executing on a computing system, in the electronic file designating the one or more portions of the electronic file to be encrypted, wherein each of said at least one named text style includes font size settings or font style settings and defines consistently formatted text;
encrypting, using encryption software, the identified one or more portions of the electronic file to thereby form encrypted one or more portions of the electronic file; and
transmitting at least one encrypted portion of the one or more portions of the electronic file with an unencrypted portion of the electronic file such that unencrypted portions of the electronic file are readable without decryption of the at least one encrypted portion of the one or more portions of the electronic file, wherein transmitting the at least one encrypted portion of the one or more portions of the electronic file includes altering the at least one named text style to appear as at least one block of color with a matching text color and background color.

14. The computer-implemented method of claim 13, wherein the encryption software encrypts the one or more portions of the electronic file using a key.

15. The computer-implemented method of claim 14, wherein the key is a public key of an intended recipient of the partially encrypted electronic file.

16. The computer-implemented method of claim 14, wherein the key is stored in a second server accessible over a network.

17. The computer-implemented method of claim 14, wherein the key is valid for a limited time period.

18. The computer-implemented method of claim 13, further comprising:
displaying a representation of the partially encrypted electronic file, the encrypted one or more portions being displayed as a block solid color with text within the one or more portions of the electronic file and background of the text sharing a common color.

19. The computer-implemented method of claim 13, further comprising:
decrypting the partially encrypted electronic file using a plug-in to a word processing program.

20. The computer-implemented method of claim 19, wherein the decryption software decrypts the partially encrypted electronic file using a key.

21. The computer-implemented method of claim 20, wherein the decryption software automatically detects the key.

22. A computer-implemented method for decrypting a partially encrypted electronic file, comprising:
receiving, at a server, an electronic file to be decrypted on behalf of a client system through at least one communication channel over which one or more encrypted portions of the electronic file and one or more unencrypted portions of the electronic file are received, wherein the encrypted portions of the electronic file are altered to appear as at least one block of color with a matching text color and background color;
identifying, the one or more encrypted portions of the electronic file to be decrypted, based on text formatting, the text formatting including font size settings or font style settings, in the electronic file designating the one or more encrypted portions of the electronic file, the text formatting determined by a plug-in to a word processing system executing on a computing system; and
decrypting, the identified one or more encrypted portions of the electronic file using decryption software.

23. The computer-implemented method of claim 22, wherein the decryption software decrypts the partially encrypted file using a key.

24. The computer-implemented method of claim 23, wherein the key is received from a second server accessible over a network.

25. A system for partially encrypting an electronic file, comprising:
a processor; and
memory storing program instructions that, when executed by the processor, cause the system to:
determine by a plug-in word processing system executing on a computing system text formatting;
identify, by encryption software, one or more portions of the electronic file to be encrypted, based on the text formatting, the text formatting including font size or font style settings, in the electronic file designating the one or more portions of the electronic file to be encrypted;

encrypt the identified one or more portions of the electronic file using the encryption software to form encrypted portions and non-encrypted portions; and storing the encrypted portions stored in the electronic file such that a word processing system without a plug-in compatible with the encryption software can properly process the non-encrypted portions of the electronic file, wherein the encrypted portions stored in the electronic file are altered to appear as at least one block of color with a matching text color and background color.

26. The system of claim 25, wherein the encryption software encrypts the one or more selected portions of the electronic file using a key.

27. The system of claim 26, wherein the key is a public key of an intended recipient of the partially encrypted electronic file.

28. The system of claim 26, wherein the key is stored in a server accessible over a network.

29. A system for decrypting a partially encrypted electronic file, comprising:
a processor; and
memory storing program instructions that, when executed by the processor, cause the system to:
identify, by the system, one or more encrypted portions of the electronic file to be decrypted, the one or more encrypted portions of the electronic file determined by a plug-in to a word processing system executing on a computing system, based at least in part on at least one named text style, the named text style including font size settings or font style settings and altering the named text style to cause encrypted text having the named text style to appear as at least one block of color with a matching text color and background color, in the electronic file designating the one or more encrypted portions of the electronic file, wherein each of said at least one named text style defines consistently formatted text; and
decrypt the identified one or more encrypted portions of the electronic file using decryption software.

30. The system of claim 29, wherein the named text style further comprises at least one of a font size, font style, or font.

31. A computer-implemented method for partially encrypting an electronic file, comprising:
identifying by a plug-in to a word processing system executing on a computing system one or more portions of the electronic file to be encrypted, based on a named text style that defines consistently formatted text, the named text style including font size settings or font style settings, in the electronic file;
encrypting the identified one or more portions of the electronic file using encryption software to thereby form encrypted one or more portions in the electronic file; and
storing the encrypted one or more portions in the electronic file such that unencrypted portions of the electronic file are readable without the plug-in to the word processing system, and altering the named text style to cause encrypted text having the named text style to appear as at least one block of color with a matching text color and background color.

32. The computer-implemented method of claim 31, wherein the named text style comprises at least one setting for a font size, font style, or font.

33. The computer-implemented method of claim 13, wherein identifying, on the server, one or more portions of the electronic file to be encrypted is performed without a user request.

\* \* \* \* \*

UNITED STATES PATENT AND TRADEMARK OFFICE
CERTIFICATE OF CORRECTION

PATENT NO. : 8,542,823 B1
APPLICATION NO. : 12/457684
DATED : September 24, 2013
INVENTOR(S) : Nguyen Page 1 of 1

It is certified that error appears in the above-identified patent and that said Letters Patent is hereby corrected as shown below:

In the Claims

Claim 26, column 13, line 13, please delete "the one or more selected portions"

and insert -- the one or more portions --

Signed and Sealed this
Third Day of June, 2014

Michelle K. Lee
*Deputy Director of the United States Patent and Trademark Office*